United States Patent Office 3,426,082
Patented Feb. 4, 1969

3,426,082
PHENOL ALKYLATION PROCESS
Robert P. Curry, Mobile, Ala., and James C. Geddes, Jr., Orangeburg, S.C., assignors to Ethyl Corporation, New York, N.Y., a corporation of Virginia
No Drawing. Continuation of application Ser. No. 307,306, Sept. 9, 1963. This application Mar. 18, 1966, Ser. No. 535,348
The portion of the term of the patent subsequent to May 19, 1981, has been dedicated to the Public
U.S. Cl. 260—624        5 Claims
Int. Cl. C07c 39/06

ABSTRACT OF THE DISCLOSURE

Process for the concurrent production of ortho-tert-butyl phenol, 2,4-di-tert-butyl phenol and 2,6-di-tert-butyl phenol by reacting a mixture of phenol, isobutylene, aluminum phenoxide catalyst and halogen compound at a temperature of from about 90° C. to 160° C. and a pressure of from about atmospheric to about 900 p.s.i.g. The aluminum phenoxide catalyst is present initially in a quantity sufficient to provide from about 0.017 to about 0.04 gram atom of aluminum per gram mol of phenol and the halogen compound is present initially in a quantity sufficient to provide from about 0.1 to about 2.47 gram mols of halogen compound per gram atom of aluminum; and the mol ratio of halogen compound to aluminum is proportioned to the mol ratio of aluminum to phenol according to a defined inverse relationship showing a decreasing maximum permissible mol ratio of halogen compound to aluminum for an increasing mol ratio of aluminum to phenol.

---

This application is a continuation of application Ser. No. 307,306, filed Sept. 9, 1963, now abandoned, which application was a continuation-in-part of application Ser. No. 71,163, filed Nov. 23, 1960 and now U.S. Patent No. 3,133,974.

Background of the invention

This invention relates to a novel low temperature process for the concurrent preparation of ortho alkyl phenols, 2,4-dialkyl phenols and 2,6-dialkyl phenols. More particularly, this invention relates to a novel low temperature process for the concurrent production of substantial quantities of ortho-tert-butyl phenol, 2,4-di-tert-butyl phenol and 2,6-di-tert-butyl phenol.

Of the various known alkylated phenols, ortho-tert-butyl phenol, 2,4-di-tert-butyl phenol and 2,6-di-tert-butyl phenol are particularly valuable in the chemical and allied arts. For example, 2,6-di-tert-butyl phenol is used extensively commercially as an antioxidant and as a necessary ingredient in the preparation of 4,4'-methylene bis-2,6-di-tert-butyl phenol, a superlative antioxidant for lubricating oils and other oxygen-sensitive organic media (U.S. Patents 3,043,775; 2,944,086; 2,807,653). Similarly, 2,4-di-tert-butyl phenol is the essential raw material for the production of 2,2'-methylene bis(4,6-di-tert-butyl phenol), another important antioxidant (U.S. Patents 2,807,653; 2,758,032). Also ortho-tert-butyl phenol is an exceedingly valuable chemical intermediate for use in the production of novel phenol-formaldehyde resins having unique properties.

Current commercial activities have imposed a demand for a process which can efficiently, effectively and concurrently produce these three tertiary butylated phenols from phenol and isobutylene; however, such a process is complicated by the facts that it must not require high temperatures and must not produce an overabundance of 2,4,6-tri-tert-butyl phenol. In such a process, temperatures as high as 180-200° C. are very undesirable in that dealkylation and rearrangement of the tertiary butyl phenols may be encountered. Furthermore, the need to supply sufficient heat to raise large quantities of reactants to such elevated temperatures in a commercial installation increases significantly the cost of the process and the resulting products. The compound 2,4,6-tri-tert-butyl phenol, which is formed readily when phenol is alkylated with isobutylene, is a detriment because there is no present volume commercial outlet for this material and it cannot be converted economically back into the above three desired, commercially important tertiary butyl phenols. Therefore, the conversion of phenol into 2,4,6-tri-tert-butyl phenol represents a distinct waste, both of valuable raw materials and of throughput in a commercial operation, and as a consequence, there is a distinct need for a low temperature process whereby phenol and isobutylene can be converted selectively into significant quantities of ortho-tert-butyl phenol, 2,4-di-tert-butyl phenol and 2,6-di-tert-butyl phenol without the formation of excessive quantities of 2,4,6-tert-butyl phenol.

An object of this invention is to provide a low temperature process whereby ortho-tert-butyl phenol, 2,4-di-tert-butyl phenol and 2,6-di-tert-butyl phenol are formed concurrently in significant quantities without the formation of an inordinate amount of 2,4,6-tri-tert-butyl phenol. Other objects will become apparent from the following description and claims.

The above and other objects have been accomplished in a very effective, efficient and economical manner by the process of this invention for the concurrent production of ortho-tert-butyl phenol, 2,4-di-tert-butyl phenol and 2,6-di-tert-butyl phenol which comprises subjecting a reaction mixture consisting essentially of phenol, isobutylene, an aluminum phenoxide catalyst and a hereinafter-defined halogen compound to a temperature of from about 90° C. to about 160° C., and preferably above 120° C., and a pressure of from about atmospheric to about 900 p.s.i.g. for a period of time ranging from that time at which each of ortho-tert-butyl phenol, 2,4-di-tert-butyl phenol and 2,6-di-tert-butyl phenol becomes present in said reaction mixture at a concentration of at least about 10 mol percent, based upon the total phenolic compounds present in said mixture, to that time at which the mol percentage ratio of $$\frac{\text{ortho-tert-butyl phenol} + \text{2,4-di-tert-butyl phenol} + \text{2,6-di-tert-butyl phenol}}{\text{2,4,6-tert-butyl phenol}}$$

no longer exceeds about 2.0; said halogen compound being at least one selected from the group consisting of hydrogen halides, tertiary butyl halides, and mixtures thereof; and said reaction mixture initially containing, (a) From about 0.002 to about 0.04 gram atom of aluminum as said catalyst per gram mol of phenol, (b) From about 0.1 to about 3.0 gram mols of said halogen compound per gram atom of aluminum in said catalyst; and (c) The maximum mol ratio of said halogen compound concentration to said aluminum concentration being proportioned to the mol ratio of said aluminum concentration to said phenol concentration according to the inverse relationship of the following table showing a decreasing maximum permissible mol ratio of halogen compound concentration to aluminum concentration for an increasing mol ratio of aluminum concentration to phenol concentration; said table of mol ratios being:

| Mol ratio of aluminum to phenol: | Permissible maximum mol ratio of halogen compound to aluminum |
|---|---|
| 0.002 | 3.00 |
| 0.014 | 3.00 |
| 0.017 | 2.47 |
| 0.020 | 2.10 |
| 0.025 | 1.68 |
| 0.030 | 1.40 |
| 0.035 | 1.20 |
| 0.040 | 1.05 |

A further embodiment of the process of this invention for the concurrent production of ortho-tert-butyl phenol, 2,4-di-tert-butyl phenol and 2,6-di-tert-butyl phenol comprises subjecting a reaction mixture consisting essentially of phenol, isobutylene, an aluminum phenoxide catalyst and a hereinafter defined halogen compound to a temperature of from about 90° C. to about 160° C., and preferably above about 120° C., and a pressure of from about atmospheric to about 900 p.s.i.g. for a period of time ranging from that time at which each of ortho-tert-butyl phenol, 2,4-di-tert-butyl phenol and 2,6-di-tert-butyl phenol becomes present in said reaction mixture at a concentration of at least about 10 mol percent, based upon the total phenolic compounds present in said mixture, to that time at which the mol percentage ratio of the sum of mol ratios of ortho-tert-butyl phenol plus 2,4-di-tert-butyl phenol plus 2,6-di-tert-butyl phenol divided by the mol ratio of 2,4,6-tert-butyl phenol no longer exceeds 2.0; said halogen compound being at least one selected from the group consisting of hydrogen halides, tertiary butyl halides, and mixtures thereof; and said reaction mixture initially containing, (a) From about 0.017 to about 0.04 gram atoms of aluminum as said catalyst per gram mol of phenol;

(b) From about 0.1 to about 2.47 gram mols of said halogen compound per gram atom of said aluminum in said catalyst; and (c) The maximum mol ratio of said halogen compound concentration to said aluminum concentration being proportioned to the mol ratio of said aluminum concentration to said phenol concentration according to the inverse relationship of the following table showing a decreasing maximum permissible mol ratio of halogen compound concentration to aluminum compound concentration for an increasing mol ratio of aluminum concentration to phenol concentration; said table of mol ratios being:

| Mol ratio of aluminum to phenol: | Permissible maximum mol ratio of halogen compound to aluminum |
|---|---|
| 0.017 | 2.47 |
| 0.020 | 2.10 |
| 0.025 | 1.68 |
| 0.030 | 1.40 |
| 0.035 | 1.20 |
| 0.040 | 1.05 |

A further preferred embodiment of the process of this invention is one described above characterized by said catalyst initially being predominantly aluminum triphenoxide.

Another preferred embodiment of the process of this invention is one described above further characterized by said halogen compound consisting essentially of hydrogen chloride.

A still further preferred embodiment of the process of this invention is one described above further characterized by said halogen compound consisting essentially of tertiary butyl chloride.

A further preferred embodiment of the process of this invention is one described above further characterized by said catalyst initially being predominantly aluminum triphenoxide and said halogen compound consisting essentially of tertiary butyl chloride.

In this process there should be present from about 2 to about 5 mols of isobutylene per each mol of phenol used. This ratio is preferred from the standpoint of optimum reaction rates; however, larger amounts of isobutylene may be used (e.g. 6 to 8 mols per mol of phenol) when temperatures approaching 160° C. are used. Conversely, a ratio of as low as about 1.5 mols of isobutylene per mol of phenol may be used, especially at temperatures approaching 120° C.

In the process of this invention, it is essential to have present in the reaction zone one or more halogen compounds, such as hydrogen halides, saturated organic halides or mixtures thereof. While the precise function performed by this halogen compound in the mechanism of the process has not been totally established, experimental evidence indicates definitely that this material is not a catalyst or a catalyst promoter. Instead, its presence in the reaction zone alters the course of the reaction beneficially so that the ortho-tert-butyl phenol, 2,4-di-tert-butyl phenol and 2,6-di-tert-butyl phenol are concurrently formed in substantial quantities. This is supported by the fact that if the halogen compound is omitted from the reaction system, these three tertiary butylated phenols are not concurrently formed in the desired substantial quantities.

Preferred halogen compounds include tertiary butyl chloride, hydrogen chloride, and mixtures thereof although other hydrogen halides and tertiary butyl halides may be used. Exemplary of other suitable compounds are hydrogen fluoride, hydrogen bromide, hydrogen iodide, tertiary butyl fluoride, tertiary butyl bromide, tertiary butyl iodide, and the like compounds.

The relative proportions of several of the ingredients of the reaction mixture are very important. The reaction mixture of the process of this invention contains initially (a) from about 0.002 to about 0.04 gram atom of aluminum as the aluminum phenoxide catalyst per gram mol of phenol, and (b) from about 0.1 to as much as about 3.0 gram mols of the halogen compound per gram atom of aluminum in the catalyst depending upon the catalyst concentration. The halogen compound concentration is proportioned according to the relationship shown in Table I below.

TABLE I

| Mol ratio of aluminum to phenol: | Permissible maximum mol ratio of halogen compound to aluminum |
|---|---|
| 0.002 | 3.00 |
| 0.014 | 3.00 |
| 0.017 | 2.47 |
| 0.020 | 2.10 |
| 0.025 | 1.68 |
| 0.030 | 1.40 |
| 0.035 | 1.20 |
| 0.040 | 1.05 |

From the above Table I, it can be seen that the mol ratio of halogen compound to aluminum is within the recited range of from about 0.1 to about 3.00 when the mol ratio of aluminum to phenol is 0.014 or less. When the mol ratio of aluminum to phenol is greater than 0.014, the mol ratio of halogen compound to aluminum must not exceed the maximum value shown in Table I to achieve the objectives of this invention.

The most preferred mol ratio of aluminum to phenol is from about 0.002 to about 0.014, and thus a preferred embodiment of this invention comprises having from about 0.1 to about 3.0 gram mols of said halogen compound per gram atom of aluminum used as said catalyst. Generally speaking, even when the mol ratio of aluminum to phenol is within the range of from about 0.002 to about 0.014, it is preferred to reduce the amount of the halogen compound within the stipulated range as the mol ratio approaches a value of 0.014, although this feature is not essential to the practice of this invention. In addition, when the lower concentrations of halogen compound are used it is desirable to use temperatures approaching the upper limits thereof which are described above.

The great importance of the aluminum phenoxide catalyst concentration and its relationship with the halogen compound is shown by the fact that when conducting a process meeting all of the qualifications of the process of this invention, except that the mol ratio of the halogen compound to the aluminum phenoxide catalyst was not within the ranges taught above, the reaction mixture never contained any more than 4 mol percent of 2,6-di-tert-butyl phenol. Thus, it can be seen that the amount of aluminum phenoxide catalyst to be employed with respect to the halogen compound must be within the above ranges in order to insure the formation of an adequate amount of 2,6-di-tert-butyl phenol even though it was known heretofore (U.S. 2,831,898) that aluminum phenoxides are excellent selective catalysts for use in the preparation of 2,6-di-tert-butyl phenol. It is seen, therefore, that the process of this invention is enigmatic.

Another technical anmoaly presented by the process of this invention is that if the amount of halogen compound present is too high (i.e. exceeds the amount specified above), the objects of this invention are not accomplished. In fact, even though larger quantities of aluminum phenoxide catalyst may be used, the use of higher concentrations of halogen compound results in a mixture which is very poor in 2,6-di-tert-butyl phenol content and excessively rich in 2,4,6-tri-tert-butyl phenol content.

Practicalities demand that the reaction mixture contain at least 10 mol percent each of ortho-tert-butyl phenol, 2,4-di-tert-butyl phenol and 2,6-di-tert-butyl phenol so that these three valuable materials may be recovered without too much difficulty and without imposing a severe economic penalty upon the process or its valuable products. By the same token, an overabundance of 2,4,6-tri-tert-butyl phenol in the reaction mixture imposes a like economic penalty upon the process since it represents waste not only of valuable raw materials but of reactor throughput. Accordingly, it is preferred to operate the process of this invention under the above-described conditions for a period of time ranging from that time at which ortho-tert-butyl phenol, 2,4-di-tert-butyl phenol and 2,6-di-tert-butyl phenol all become present in the reaction mixture at a concentration of at least about 10 mol percent each, based upon the total phenolic compounds present in the mixture, to that time at which the mol percentage ratio of $$\frac{\text{ortho-tert-butyl phenol} + 2,4\text{-di-tert-butyl phenol} + 2,6\text{-di-tert-butyl phenol}}{2,4,6\text{-tri-tert-butyl phenol}}$$

no longer exceeds about 2.5; however, in situations where phenol and isobutylene raw materials are readily available at low costs, this mol percentage ratio may be extended down to about 2.0 provided, however, that the three desired tertiary butylated phenols are present in the reaction mixture to absolute molar concentrations of at least 10 percent each.

The aluminum phenoxide catalyst used in the process of this invention may be prepared in a number of ways. One method is to react phenol directly with aluminum metal to form the aluminum phenoxide. Another method is to react phenol with an aluminum derivative of an acid which is weaker than phenol. Still another method for preparing the catalyst is to react a salt of phenol, such as sodium phenoxide, with a halide of aluminum, such as $AlCl_3$, $AlBr_3$, etc. A further method is by reacting an aluminum alkyl or an aluminum hydride with phenol. In short, any known process by which an aluminum phenoxide can be formed may be used in the practice of this invention.

In general, it is preferred to use a compound as the catalyst which initially is aluminum triphenoxide, although during the course of the reaction the chemical make-up of this phenoxide catalyst may become altered either by alkylation of one or more of the phenoxide rings by the isobutylene or by replacement of one or more of the phenoxide rings by a corresponding number of alkylated phenoxide groups from the alkylated phenols formed in the reaction system. If desired, the initial aluminum phenoxide catalyst may be formed from ortho-tert-butyl phenol or the like; however, when this method is employed, the alkyl substituents on the phenol should be one or more tertiary butyl groups so that the high purity of the reaction product is not impaired by the liberation of other phenolic ingredients during the process.

The catalyst reaction may be performed or catalyst prepared in situ, and there are certain advantages in utilizing an in situ formed catalyst. One such advantage is that a separate reaction step becomes unnecessary and the quantity of materials necessary to form the requisite concentration of catalyst so-formed can be readily calculated beforehand. Furthermore, methods are known by which one or more of the above-described halogen compounds may be formed as a by-product during the course of the aluminum phenoxide catalyst preparation. For example, aluminum chloride may be prereacted in situ to form aluminum triphenoxide and the requisite concentration of hydrogen chloride.

This invention will be further understood by reference to the following examples in which all parts and percentages are by weight unless otherwise specified.

Example I

An alkylation reaction in accordance with this invention was conducted, in a batchwise manner, employing a heated reaction vessel equipped with a stirring means and a means for introducing and withdrawing chemical reagents. During the course of the reaction, the vessel was heated and agitated, and samples of the reaction mixture were taken at frequent intervals and analyzed by gas chromatography to determine the nature and quantity of each component therein. In this experiment, the aluminum triphenoxide catalyst was present at a concentration of 0.01 gram atom of aluminum per gram mol of phenol and tertiary butyl chloride was present throughout the reaction. The concentration of chlorine corresponded to 3 gram atoms thereof per each gram mol of the aluminum in the catalyst. The isobutylene concentration was equivalent to approximately 4 mols per each mol of phenol. During the course of the reaction, the temperature was maintained at approximately 150° C. and the pressure ranged from approximately 400 p.s.i.g. to 130 p.s.i.g. The make-up of the reaction mixture after operation for 90 minutes under the above conditions is shown in Table II below.

TABLE II.—PRODUCT DISTRIBUTION AFTER 90 MINUTES OF OPERATION

| Phenolic component: | Product distribution, mol percent |
|---|---|
| (a) 2,4-di-tert-butyl phenol | 10 |
| (b) 2,6-di-tert-butyl phenol | 13 |
| (c) Ortho-tert-butyl phenol | 49 |
| (d) 2,4,6-tri-tert-butyl phenol | 4 |
| (e) Phenol | 20 |

It can be seen from Table II above that at about 90 minutes each of the ortho-tert-butyl, 2,4-di-tert-butyl phenol and 2,6-di-tert-butyl phenol became present in the reaction mixture at a concentration of at least 10 mol percent. In addition, the mol percentage ratio obtained by the sum of mol percent of ortho-tert-butyl phenol plus 2,4-ditert-butyl phenol plus 2,6-di-tert-butyl phenol divided by the mol percent of 2,4,6-tri-tert-butyl phenol was 18.

After 120 minutes of reaction under the above described conditions, the make-up of the reaction mixture was as is shown in Table III below.

TABLE III.—PRODUCT DISTRIBUTION AFTER 120 MINUTES OF OPERATION

| Phenolic component: | Product distribution, mol percent |
|---|---|
| (a) 2,4-di-tert-butyl phenol | 14 |
| (b) 2,6-di-tert-butyl phenol | 19 |
| (c) Ortho-tert-butyl phenol | 50 |
| (d) 2,4,6-tri-tert-butyl phenol | 8 |
| (e) Phenol | 6 |

From the above Table III it is seen that the mol percentage ratio obtained by the sum of mol percent of ortho-tert-butyl phenol plus 2,4-di-tert-butyl phenol plus 2,6-di-tert-butyl phenol divided by the mol percent of 2,4,6-tri-tert-butyl phenol was about 10.

When the above procedure is repeated except that a catalyst concentration of 0.002 is employed, similar results are obtained; however, the reaction rate is lower.

Example II

Another alkylation run was conducted in accordance with this invention, as described in Example I, with the exception that the pressure ranged from approximately 375 p.s.i.g. to 238 p.s.i.g. The make-up of the reaction mixture after operation for varying times ranging from 25 minutes to 70 minutes under the above conditions is shown in Table IV below.

TABLE IV.—PRODUCT DISTRIBUTION AFTER VARIOUS TIME PERIODS OF OPERATION

| | Product distribution, mol percent | | | | | | | |
|---|---|---|---|---|---|---|---|---|
| Minutes | 25 | 30 | 35 | 40 | 45 | 50 | 60 | 70 |
| Phenolic component: | | | | | | | | |
| (a) 2,4-di-tert-butyl phenol | 25 | 24 | 22 | 21 | 19 | 18 | 15 | 14 |
| (b) 2,6-di-tert-butyl phenol | 10 | 13 | 15 | 18 | 22 | 25 | 32 | 36 |
| (c) Ortho-tert-butyl phenol | 33 | 33 | 33 | 32 | 30 | 28 | 21 | 16 |
| (d) 2,4,6-tri-tert-butyl phenol | 19 | 21 | 23 | 25 | 27 | 28 | 32 | 33 |
| (e) Phenol | 9 | 7 | 6 | 4 | 3 | 3 | 2 | 1 |

The data presented in Table VI above show clearly that throughout the indicated time period, the individual mol percent of ortho-tert-butyl phenol, 2,4-di-tert-butyl phenol, and 2,6-di-tert-butyl phenol each exceeded 10 mol percent. In this run, the time period ranging from about 25 to about 50 minutes of operation constitutes a preferred embodiment of this invention since in all cases the mol percent ratio of the sum of mol percent of ortho-tert-butyl phenol plus 2,4-di-tert-butyl phenol plus 2,6-di-tert-butyl phenol divided by the mol percent of 2,4,6-tri-tert-butyl phenol was at least 2.5. The time period of from about 50 to about 70 minutes is within the scope of this invention inasmuch as the foregoing ratio during this period was at least 2.0.

When tertiary butyl iodide was substituted for tertiary butyl chloride in the above procedure, substantially the same results are realized.

Example III

Employing the procedure of Example I above, a run was made with an aluminum triphenoxide catalyst concentration of 0.02 gram atoms of aluminum per gram mol of phenol. The tertiary butyl chloride was present in a concentration corresponding to 2.0 gram atoms of chlorine per each gram mol of the aluminum catalyst. The isobutylene concentration was equivalent to approximately 4 mols thereof per mol of phenol. The reactants were heated for approximately 30 minutes until they attained at temperature of about 108° C., and after heating for 75 minutes at 105° C., a quantity was analyzed and found to have the mol percent concentrations shown below in Table V. The remainder of the reaction mass was heated for an additional 135 minutes at 105° C. and the results at this point of time are shown also in Table V below.

TABLE V.—PRODUCT DISTRIBUTION AFTER ELAPSED TIMES

| Phenolic component | Product distribution, mol percent | |
|---|---|---|
| | 75 minutes | 135 minutes |
| (a) 2,4-di-tert-butyl phenol | 7.9 | 12.5 |
| (b) 2,6-di-tert-butyl phenol | 10.8 | 15.6 |
| (c) Ortho-tert-butyl phenol | 43.1 | 34.3 |
| (d) 2,4,6-tri-tert-butyl phenol | 3.6 | 9.2 |
| (e) Phenol | 24.3 | 25.1 |

When the above example was repeated employing a catalyst concentration of 0.03 and tertiary butyl bromide at a concentration of corresponding to 1.40 gram atoms of bromine per each gram mol of the aluminum catalyst, similar results are achieved.

Example IV

Employing the same procedure and apparatus of Example I, an aluminum triphenoxide catalyst concentration of 0.02 gram atom of aluminum per gram mol of phenol was utilized. The halogen compound was a mixture of tertiary butyl chloride and hydrogen chloride present at a concentration corresponding to 1.2 gram atoms of chlorine per each gram mol of the aluminum catalyst. The isobutylene concentration was equivalent to approximately 4 mols thereof per mol of phenol. Heat was applied to the reactants for 25 minutes to bring them up to a temperature of about 140° C. whereafter they were held at this temperature for 17 minutes. The makeup of the reaction mixture after this period of operation is shown in Table VI below.

TABLE VI.—PRODUCT DISTRIBUTION AFTER 17 MINUTES OF OPERATION

| Phenolic component: | Product distribution, mol percent |
|---|---|
| (a) 2,4-di-tert-butyl phenol | 10.6 |
| (b) 2,6-di-tert-butyl phenol | 31.0 |
| (c) Ortho-tert-butyl phenol | 39.3 |
| (d) 2,4,6-tri-tert-butyl phenol | 9.5 |
| (e) Phenol | 5.0 |

Employing a catalyst concentration of 0.04 and a quantity of the halogen compound corresponding to a concentration of 1.05 gram atoms of chlorine per each gram mol of the aluminum catalyst in the above procedure, essentially the same results are obtained.

Example V

Employing the apparatus and procedure of Example I, a catalyst concentration of 0.02 gram atom of aluminum per gram mol of phenol and hydrogen chloride as the halogen compound at a concentration of 0.65 gram atom of chlorine per each gram mol of the aluminum catalyst was used. The reactants were heated for 30 minutes to raise their temperature up to 140° C. and thereafter were held at this temperature for about 25 minutes. The reaction was terminated after this period and upon analysis was found to have the makeup as shown in Table VII below.

TABLE VII.—PRODUCT DISTRIBUTION AFTER 26 MINUTES OF OPERATION

| Phenolic component: | Product distribution, mol percent |
|---|---|
| (a) 2,4-di-tert-butyl phenol | 10.1 |
| (b) 2,6-di-tert-butyl phenol | 21.7 |
| (c) Ortho-tert-butyl phenol | 51.4 |
| (d) 2,4,6-tri-tert-butyl phenol | 3.6 |
| (e) Phenol | 8.4 |

When hydrogen fluoride is substituted for hydrogen chloride in the above example, similar results are obtained.

The following example is presented to demonstrate the importance of maintaining the proper relationship between the catalyst and halogen compound.

Example VI

An alkylation run not of this invention was conducted in approximately the same manner as described in Example I except that the proper relationship between the aluminum triphenoxide catalyst concentration and that of the halogen compound was not followed. In all other respects, this run was in accordance with the process of this invention. In particular, the run was carried out in a batchwise manner employing a heated reaction vessel equipped with a stirring means and means for introducing and withdrawing chemical reagents. During the course of the run, the vessel was heated and agitated, and samples of the reaction mixture were taken at frequent intervals over the period of 168 minutes of operation to determine the nature and quantity of each component therein. In this run the aluminum triphenoxide catalyst was present at a concentration of 0.017 gram atom of aluminum per gram mol of phenol and tertiary butyl chloride was present throughout the reaction. The concentration of chlorine corresponded to 3.0 gram atoms thereof per each gram mol of aluminum catalyst. The isobutylene concentration was equivalent to approximately 4 mols per each mol of phenol. The temperature was maintained at approximately 150° C. throughout the reaction and during this time the pressure ranged from approximately 320 p.s.i.g. to 210 p.s.i.g. It was found that at no time during the course of the reaction did the concentration of 2,6-di-tert-butyl phenol exceed 4 mol percent based on the total phenolic content of the reaction mixture. Consequently, this run completely failed to achieve the objects of this invention.

As taught above, it is known (U.S. 2,831,898) that aluminum phenoxides are excellent selective catalysts for use in the preparation of 2,6-di-tert-butyl phenol; however, to achieve the unique product distribution of the present invention, it is essential to employ the recited halogen compound. To demonstrate this, the process of the patent recited above was conducted in the absence of a halogen compound. In the following example, a catalyst concentration of 0.02 gram atom of aluminum per gram mol of phenol was employed, and the isobutylene concentration was equivalent to approximately 4 mols per each mol of phenol. The reactants were heated for 46 minutes to bring their temperature up to about 140° C. and this temperature, as well as the other conditions taught in that patent, were maintained for the various periods of time as shown below in Table VIII showing the product distribution of the reaction mass during such time intervals.

TABLE VIII.—PRODUCT DISTRIBUTION AFTER TIME PERIODS OF OPERATION

| Time, minutes | Product distribution, mol percent | | | |
|---|---|---|---|---|
| | 15 | 30 | 45 | 55 |
| Phenolic component: | | | | |
| (a) 2,4-di-tert-butyl phenol | 0.7 | 1.1 | 1.3 | 1.1 |
| (b) 2,6-di-tert-butyl phenol | 14.7 | 34.3 | 64.6 | 80.4 |
| (c) Ortho-tert-butyl phenol | 50.7 | 52.8 | 29.6 | 9.3 |
| (d) 2,4,6-tri-tert-butyl phenol | 0.3 | 1.3 | 3.3 | 8.8 |
| (e) Phenol | 20.7 | 6.8 | 1.2 | 0.4 |

As a further demonstration, the same procedure as above was employed except the reaction was conducted at 140° C. and at a constant pressure of 292 p.s.i.g. The results of this run are shown in Table IX below.

TABLE IX.—PRODUCT DISTRIBUTION AFTER TIME PERIODS OF OPERATION

| Time, minutes | Product distribution, mol percent | | |
|---|---|---|---|
| | 20 | 40 | 50 |
| Phenolic component: | | | |
| (a) 2,4-di-tert-butyl phenol | 2.5 | 1.0 | 0.0 |
| (b) 2,6-di-tert-butyl phenol | 34.4 | 70.0 | 84.0 |
| (c) Ortho-tert-butyl phenol | 54.6 | 17.0 | 1.0 |
| (d) 2,4,6-tri-tert-butyl phenol | 3.0 | 11.0 | 15.0 |
| (e) Phenol | 3.0 | 1.0 | 0.0 |

It can be seen clearly from the above results that the two runs conducted in the absence of a halogen compound completely failed to achieve the objects of this invention inasmuch as the mol percent of 2,4-di-tert-butyl phenol never reached the requisite 10 mol percent, in fact never exceeded 2.5.

As indicated by the working examples, the process of this invention may be conducted in a batchwise manner by adding all of the necessary ingredients to a reaction vessel, sealing it and heating the system to the requisite temperature for an appropriate period of time. It is desirable to provide for sufficient agitation of the reaction system during the process to insure thorough mixing of the various components of the system. Alternatively, the isobutylene component may be fed into the reaction system in incremental portions or continuously (a semi-batch procedure) during the run.

Tertiary butylation of phenol in accordance with this invention may be conducted in a continuous manner by passing the reactants, the aluminum phenoxide catalyst and the halide compound in appropriate proportions through a reaction zone where they are subjected to the conditions of heat, pressure and mixing necessary to accomplish the objects of this invention. In such an embodiment, any unreacted phenol or isobutylene, or both, may be recycled into the reactor.

When the reaction has reached the appropriate product distribution, either in a batch or in a continuous operation, the reaction mixture should be contacted with a sufficient quantity of water, aqueous caustic solution or aqueous acid solution to hydrolyze the catalyst and terminate the reaction. To do this, the reaction mixture may be cooled and charged to a vessel containing water, aqueous caustic solution, or an aqueous acid such as HCl solution. The ortho-tert-butyl phenol, 2,4-di-tert-butyl phenol and 2,6-di-tert-butyl phenol are recovered from the resultant reaction mixture by distillation, extraction or like procedures, and to effect this separation, the use of fractional distillation, especially at reduced pressure, is particularly desirable.

For the process of this invention, it is preferred to use from about 0.005 to about 0.012 gram atom of aluminum as the aluminum phenoxide catalyst, most preferably as aluminum triphenoxide, per gram mol of phenol and from about 1.0 to about 3.0 gram atoms of the halogen, most preferably chlorine as the halogen compound per gram mol of aluminum catalyst. In this manner, the maximum benefits characterizing this invention are achieved, especially at temperatures ranging from about 140° C. to about 160° C. and pressures ranging from about 150 p.s.i.g. to 500 p.s.i.g. Operating in this manner, the concentration of the catalyst and the halogen compound may be of any value within these ranges and the concentration of the catalyst need not be proportioned to that of the halogen compound.

The use of an inert diluent is unnecessary for the process although it is within the scope of the invention to use such a reaction diluent. Paraffins, cycloparaffins, and aromatic hydrocarbons are examples of suitable inert diluents which are compatible with the components of the reaction system and which can be used for diluent purposes. If desired, an inert gas such as nitrogen, argon, helium, krypton, or gaseous paraffinic hydrocarbons may be used as an inert atmosphere.

While this invention has been described with particular reference to the alkylation of phenol with isobutylene, it will be understood that the principles of operation herein described may be applied very successfully to the alkylation of other phenols such as meta-cresol, ortho-tert-butyl phenol, ortho-isopropyl phenol, and the like. Furthermore, it is within the scope of this invention to apply the novel principles of operation to the alkylation of phenol or other phenolic compounds, such as those just described, using propylene or the various pentenes, hexenes, heptenes, octenes, etc. which are normally applicable for use as reactants in phenol alkylation procedures. Generally speaking, the reaction conditions described herein are directly translatable to other processes, and any slight modifications which may be desirable will, of course, now be apparent to one skilled in the art. Exemplary of halogen compound, preferably saturated organic halides, that may be employed as described above, are propyl chloride, propyl iodide, isopropyl chloride, pentyl fluoride, 3-(bromo-methyl) pentane, hexyl chloride, heptyl bromide, octyl iodide, and the like.

What is claimed is:

1. A process for the concurrent production of ortho-tert-butyl phenol, 2,4-di-tert-butyl phenol and 2,6-di-tert-butyl phenol which comprises subjecting a reaction mixture consisting essentially of phenol, isobutylene, an aluminum phenoxide catalyst and a hereinafter-defined halogen compound to a temperature of from about 90° C. to 160° C. and a pressure of from about atmospheric to about 900 p.s.i.g. for a period of time ranging from that time at which each of ortho-tert-butyl phenol, 2,4-di-tert-butyl phenol and 2,6-di-tert-butyl phenol becomes present in said reaction mixture at a concentration of at least about 10 mol percent based upon the total phenolic compounds present in said mixture to that time at which the mol percent ratio of $$\frac{\text{ortho-tert-butyl phenol} + 2,4\text{-di-tert-butyl phenol} + 2,6\text{-di-tert-butyl phenol}}{2,4,6\text{-di-tert-butyl phenol}}$$

no longer exceeds about 2.0; said halogen compound being at least one selected from the group consisting of hydrogen halides, tertiary butyl halides, and mixtures thereof; and said reaction mixture containing initially, (a) from about 0.017 to about 0.04 gram atoms of aluminum as said catalyst per gram mol of phenol;
(b) from about 0.1 to about 2.47 gram mols of said halogen compound per gram atom of said aluminum in said catalyst; and
(c) the maximum mol ratio of said halogen compound concentration to said aluminum concentration being proportioned to the mol ratio of said aluminum concentration to said phenol concentration according to the inverse relationship of the follwing taoble showing a decreasing maximum permissible mol ratio of halogen compound concentration to aluminum concentration for an increasing mol ratio of aluminum concentration to phenol concentration; said table of mol ratios being:

| Mol ratio of aluminum to phenol: | Permissible maximum mol ratio of halogen compound to aluminum |
|---|---|
| 0.017 | 2.47 |
| 0.020 | 2.10 |
| 0.025 | 1.68 |
| 0.030 | 1.40 |
| 0.035 | 1.20 |
| 0.040 | 1.05 |

2. The process of claim 1 further characterized by said catalyst initially being predominantly aluminum triphenoxide.

3. The process of claim 1 further characterized by said halogen compound consisting essentially of tertiary butyl chloride.

4. The process of claim 1 further characterized by said halogen compound consisting essentially of hydrogen chloride.

5. The process of claim 1 further characterized by said aluminum phenoxide catalyst being formed in situ.

6. The proces of claim 1 further characterized by said isobutylene being present in amount of from 2 mols to about 5 mols per each mol of phenol.

References Cited

UNITED STATES PATENTS 3,133,974   5/1964   Curry et al. _____ 260—624
3,200,157   8/1965   Buls et al. _____ 260—624

LEON ZITVER, *Primary Examiner.*

W. B. LONE, *Assistant Examiner.*